(12) United States Patent
Hatada

(10) Patent No.: US 11,785,163 B2
(45) Date of Patent: Oct. 10, 2023

(54) PRINTER, SERVER AND NON-TRANSITORY COMPUTER-READABLE RECORDING MEDIA STORING COMPUTER READABLE INSTRUCTIONS FOR PRINTER AND SERVER

(71) Applicant: BROTHER KOGYO KABUSHIKI KAISHA, Nagoya (JP)

(72) Inventor: Kumi Hatada, Tokai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/053,912

(22) Filed: Nov. 9, 2022

(65) Prior Publication Data

US 2023/0080983 A1    Mar. 16, 2023

Related U.S. Application Data

(62) Division of application No. 17/216,912, filed on Mar. 30, 2021.

(30) Foreign Application Priority Data

Apr. 1, 2020   (JP) ................. 2020-065911

(51) Int. Cl.
*G06F 3/12*     (2006.01)
*H04N 1/32*     (2006.01)
*G06K 15/02*    (2006.01)

(52) U.S. Cl.
CPC ....... *H04N 1/32117* (2013.01); *G06F 3/1203* (2013.01); *G06F 3/1231* (2013.01); *G06F 3/1232* (2013.01); *H04N 1/32096* (2013.01)

(58) Field of Classification Search
None
See application file for complete search history.

(56) References Cited

U.S. PATENT DOCUMENTS 8,964,223 B2    2/2015  Sato
2004/0190052 A1  9/2004  Sando
(Continued)

FOREIGN PATENT DOCUMENTS

CN    101320316 A    12/2008
CN    102193755 A    9/2011
(Continued)

OTHER PUBLICATIONS

Office Action dated Mar. 30, 2022 received in U.S. Appl. No. 17/216,912.

(Continued)

*Primary Examiner* — Beniyam Menberu
(74) *Attorney, Agent, or Firm* — Scully, Scott, Murphy & Presser, PC

(57) ABSTRACT

A first printer may include a controller configured to: in a case where a first predetermined operation is accepted in a state where second printer identification information and specific service-related information are stored in association with each other in the server, cause the display unit to display a notification screen that prompts a second predetermined operation, the second predetermined operation being for changing a printer used for the service from a second printer to the first printer; and in a case where the second predetermined operation is accepted, send a printer changing request including first printer identification information to the server. In a case where the printer changing request is sent to the server, the first printer identification information is stored, instead of the second printer identification information, in association with the specific service-related information in the server.

12 Claims, 7 Drawing Sheets

(56) References Cited

U.S. PATENT DOCUMENTS

| | | | |
|---|---|---|---|
| 2010/0253962 A1 | 10/2010 | Higuchi et al. | |
| 2013/0151678 A1* | 6/2013 | Fukasawa | H04L 41/0846 |
| | | | 709/221 |
| 2016/0292550 A1 | 10/2016 | Kawai | |
| 2018/0074768 A1 | 3/2018 | Abe | |
| 2021/0103498 A1 | 4/2021 | Yoshimura et al. | |
| 2021/0390064 A1 | 12/2021 | Ekpenyong et al. | |

FOREIGN PATENT DOCUMENTS

| | | | | |
|---|---|---|---|---|
| JP | 2005053643 A | | 3/2005 | |
| JP | 2005267002 A | | 9/2005 | |
| JP | 2009175983 A | | 8/2009 | |
| JP | 2015141569 | * | 8/2015 | H04N 1/00 |
| JP | 2015141569 A | | 8/2015 | |
| JP | 2016063301 | * | 4/2016 | H04N 1/00 |
| JP | 2016063301 A | | 4/2016 | |
| JP | 2016126462 A | | 7/2016 | |
| JP | 2016157262 A | | 9/2016 | |
| JP | 2016193592 A | | 11/2016 | |
| JP | 2016207087 A | | 12/2016 | |
| JP | 2017074745 A | | 4/2017 | |

OTHER PUBLICATIONS

Office Action dated Aug. 12, 2022 received in U.S. Appl. No. 17/216,912.

* cited by examiner

PRINTER, SERVER AND NON-TRANSITORY COMPUTER-READABLE RECORDING MEDIA STORING COMPUTER READABLE INSTRUCTIONS FOR PRINTER AND SERVER

CROSS-REFERENCE TO RELATED APPLICATION

This application is a divisional of U.S. patent application Ser. No. 17/216,912, filed on Mar. 30, 2021, which is claims priority to Japanese Patent Application No. 2020-065911, filed on Apr. 1, 2020, the entire contents of which are incorporated herein by reference.

TECHNICAL FIELD

The disclosure herein discloses a technique in which a server provides a service using a printer.

BACKGROUND

A printer capable of executing a flat-rate printing process is known. With the flat-rate printing process, the printer prints a predetermined number of sheets at a fixed rate every predetermined period.

SUMMARY

The above technique does not give any consideration to changing the printer used for the flat-rate printing process. The disclosure herein provides a technique that enables a printer used for a service to be changed.

A first printer disclosed herein may include: a display unit; a communication interface for communicating with a server, wherein the server is configured to store, for each of one or more printers, printer identification information for identifying the printer and service-related information for providing a service using the printer in association with each other, the service-related information being obtained by using information received from the printer; and a controller. The controller may be configured to: in a case where a first predetermined operation is accepted in a state where second printer identification information for identifying a second printer and specific service-related information are stored in association with each other in the server, cause the display unit to display a notification screen that prompts a second predetermined operation, the second printer being different from the first printer, and the second predetermined operation being for changing a printer used for the service from the second printer to the first printer; and in a case where the second predetermined operation is accepted after the notification screen has been displayed, send a printer changing request including first printer identification information for identifying the first printer to the server via the communication interface, wherein in a case where the printer changing request is sent to the server, the first printer identification information included in the printer changing request is stored, instead of the second printer identification information, in association with the specific service-related information in the server.

Also, a server disclosed herein may include a communication interface for communicating with a printer; a memory configured to store, for each of one or more printers, printer identification information for identifying the printer and service-related information for providing a service using the printer in association with each other, the service-related information being obtained by using information received from the printer; and a controller. The controller may be configured to: in a state where second printer identification information for identifying a second printer and specific service-related information are stored in association with each other in the memory, receive a printer changing request from a first printer via the communication interface, the first printer being different from the second printer, the printer changing request including first printer identification information for identifying the first printer; and in a case where the printer changing request is received from the first printer, store the first printer identification information included in the printer changing request, instead of the second printer identification information, in association with the specific service-related information.

A computer program and a non-transitory computer-readable medium storing computer readable instructions for the first printer are also novel and useful. A computer program and a non-transitory computer-readable medium storing computer readable instructions for the server are also novel and useful. Methods carried out by the first printer and the server are also novel and useful. Moreover, a communication system comprising the first printer and the server is also novel and useful.

DETAILED DESCRIPTION

First Embodiment

Figure 1:
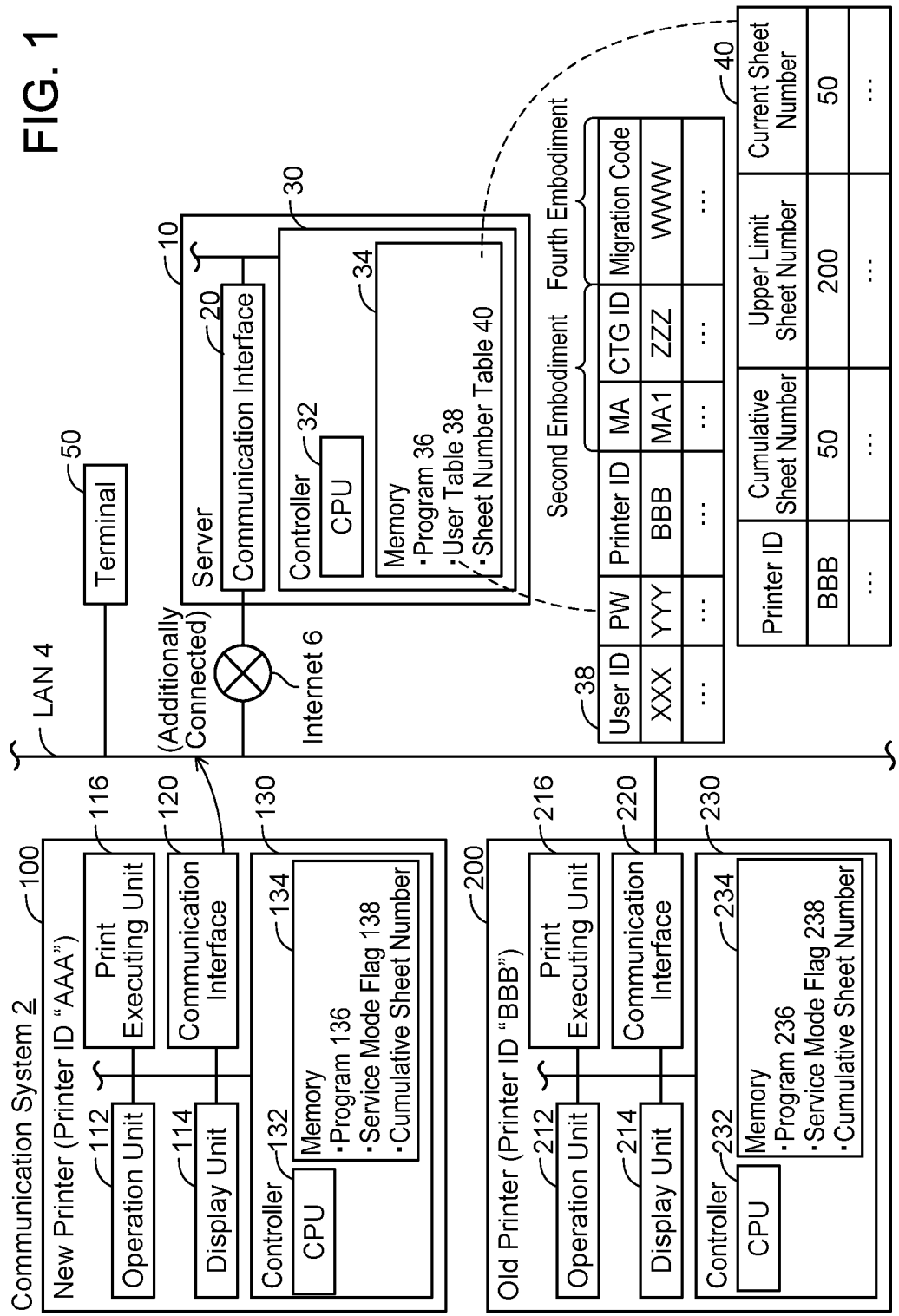
FIG. 1 shows a configuration of a communication system.

Configuration of Communication System 2; FIG. 1

As shown in FIG. 1, a communication system 2 includes a server 10, a terminal 50, and a plurality of printers 100 and 200. The printer 200 and the terminal 50 are connected to a Local Area Network (LAN) 4. The LAN 4 may be either a wired LAN or a wireless LAN. In the present embodiment, in such situation, a user additionally connects the printer 100 to the LAN 4. Consequently, the devices 50, 100, and 200 become communicable with one another via the LAN 4. For example, the terminal 50 can cause a printer (e.g., 100) to execute printing by instructing the printer to do so via the LAN 4.

The LAN 4 is connected to the Internet 6. The server 10 is installed on the Internet 6. The server 10 is a server for providing a flat-rate printing service. The server 10 is communicable with the devices 50, 100, and 200 via the Internet 6.

The flat-rate printing service is a service that allows printing to a preset number (e.g., 200) of print medium at a fixed rate every predetermined period (e.g., every month). The present embodiment assumes, particularly, that a printer used for the flat-rate printing service is changed from the printer 200 to the printer 100.

Here, the flat-rate printing service using a printer is different, as described below, from a flat-rate communication service using a general mobile phone (i.e., a service allowing communication of a preset amount of data at a fixed rate). For the flat-rate printing service, the server needs to regularly receive information on the number of printed sheets from the printer in order to manage the number of sheets related to printing. On the other hand, for the flat-rate communication service, the server does not need to receive information on the amount of data from the mobile phone because the communication in the mobile phone is executed via the server. Because of the difference, a mechanism for changing a printer used for the flat-rate printing service is different from a mechanism for changing a mobile phone used for the flat-rate communication service. The following describes a technique that enables a printer used for the flat-rate printing service to be changed appropriately.

Configuration of Printer 100

The printer 100 is a peripheral device (i.e., a peripheral device of the terminal 50, etc.) configured to execute a print function. The printer 100 may be a multi-function device configured to execute a scan function, a FAX function, and the like, in addition to the print function. A printer ID "AAA", which is information for identifying the printer 100, is assigned to the printer 100.

Once a cartridge containing a color material (hereinafter, a cartridge will be simply referred to as "CTG") is mounted on the printer 100, the printer 100 can execute printing by using the color material. In the present embodiment, the printer 100 is configured to use both a single-purpose CTG for receiving the flat-rate printing service and a general-purpose CTG different from the single-purpose CTG. For example, once a flat-rate printing service contract has been concluded by a user, the single-purpose CTG is sent to the user from a vendor of the printer 100 or a business entity associated with the vendor. The general-purpose CTG is a generally distributed CTG that the user can purchase at a home appliance store, by mail order, or the like, for example.

The printer 100 includes an operation unit 112, a display unit 114, a print executing unit 116, a communication interface (hereinafter, an interface will be denoted as "I/F") 120, and a controller 130. The units 112 to 130 are connected to a bus line (reference sign omitted). The operation unit 112 includes a plurality of keys. The user can input various instructions to the printer 100 by operating the operation unit 112. The display unit 114 is a display configured to display various information. The communication I/F 120 is an I/F configured to execute communication and is connected to the LAN 4.

The print executing unit 116 includes a print mechanism of ink jet scheme or laser scheme. A CTG containing color material, such as ink, toner, or the like, is mounted on the print executing unit 116. The CTG is provided with an IC chip, and the print executing unit 116 includes a reader (not shown) configured to read information in the IC chip. In the IC chip of the single-purpose CTG, single-purpose information (e.g., a predetermined code), which indicates that the CTG is the single-purpose CTG, is described. In the IC chip of the general-purpose CTG, the single-purpose information is not described. Therefore, when a CTG is mounted, the printer 100 can determine whether the CTG is the single-purpose CTG or the general-purpose CTG by reading the information in the IC chip of the CTG.

The controller 130 includes a CPU 132 and a memory 134. The CPU 132 is configured to execute various processes according to a program 136 stored in the memory 134. The memory 134 is configured of a volatile memory, a non-volatile memory, and the like. The memory 134 stores a service mode flag 138 and a cumulative number of sheets (which will be termed "cumulative sheet number" hereinbelow).

The service mode flag 138 indicates a flag value of either "ON" or "OFF". The printer 100 is configured to operate selectively in any one of a plurality of operation modes including a mode in which the printer 100 is capable of executing printing by using the single-purpose CTG and a mode in which the printer 100 is capable of executing printing by using the general-purpose CTG but incapable of executing printing by using the single-purpose CTG. In the following description, the former mode and the latter mode will be termed "service mode ON" and "service mode OFF", respectively. When the operation mode of the printer 100 is the service mode ON, the service mode flag 138 indicates "ON", while when the operation mode of the printer 100 is the service mode OFF, the service mode flag 138 indicates "OFF". The cumulative sheet number is a cumulative number of sheets of print medium printed by using the single-purpose CTG.

The printer 100 regularly sends information indicating the cumulative sheet number to the server 10. Thus, the server 10 can know the total number of printed sheets within the predetermined period based on the cumulative sheet number, and can provide the flat-rate printing service. Further, the printer 100 also regularly sends information indicating a remaining amount of the color material in the single-purpose CTG and the like to the server 10, although detailed description with drawings is omitted for that. Thus, when detecting that the remaining amount is less than a threshold, the server 10 can execute a process for shipping a new single-purpose CTG to the user.

Configuration of Printer 200

A printer ID "BBB" is assigned to the printer 200. The printer 200 includes an operation unit 212, a display unit 214, a print executing unit 216, a communication I/F 220, and a controller 230. The controller 230 includes a CPU 232 and a memory 234. The memory 234 stores a program 236, a service mode flag 238, and a cumulative sheet number. These configurations are the same as the corresponding configurations of the printer 100.

Configuration of Terminal 50

The terminal 50 is, for example, a portable terminal device such as a mobile phone, a smart phone, a PDA, a tablet PC, or the like. In a variant, the terminal 50 may be a stationary PC, a notebook PC, or the like. The terminal 50 includes a camera, an application for executing communication via the Internet 6 (e.g., a browser), an application for executing email communication (e.g., a mailer), and an application for decoding a QR Code (registered trademark).

Configuration of Server 10

The server 10 is installed on the Internet 6 by the vendor of the printer 100, 200. In a variant, the server 10 may be installed on the Internet 6 by a business entity different from the vendor.

The server 10 includes a communication I/F 20 and a controller 30. The units 20 to 30 are connected to a bus line (reference sign omitted). The communication I/F 20 is connected to the Internet 6. The controller 30 includes a CPU 32 and a memory 34. The CPU 32 is configured to execute various processes according to a program 36 stored in the memory 34. The memory 34 is configured of a volatile memory, a non-volatile memory, and the like. The memory 34 stores a user table 38 and a sheet number table 40.

The user table 38 stores a user ID for identifying a user, a password (which will be simply denoted as "PW" hereinbelow), and a printer ID in association with each other. These pieces of information are stored in the user table 38 through a process of FIG. 2 to be described later. In the following description, a user ID and a PW may be collectively referred to as "account information".

The sheet number table 40 stores a printer ID, a cumulative sheet number of the printer identified by the printer ID, an upper limit sheet number, and a current number of printed sheets (which will be termed "current sheet number" hereinbelow) in association with each other. The upper limit sheet number is an upper limit of the number of printed sheets allowed within the predetermined period in the flat-rate printing service. The current sheet number is the number of actually printed sheets within the predetermined period. These pieces of information are stored in the sheet number table 40 through the process of FIG. 2 or a process of FIG. 4 to be described later.

Figure 2:
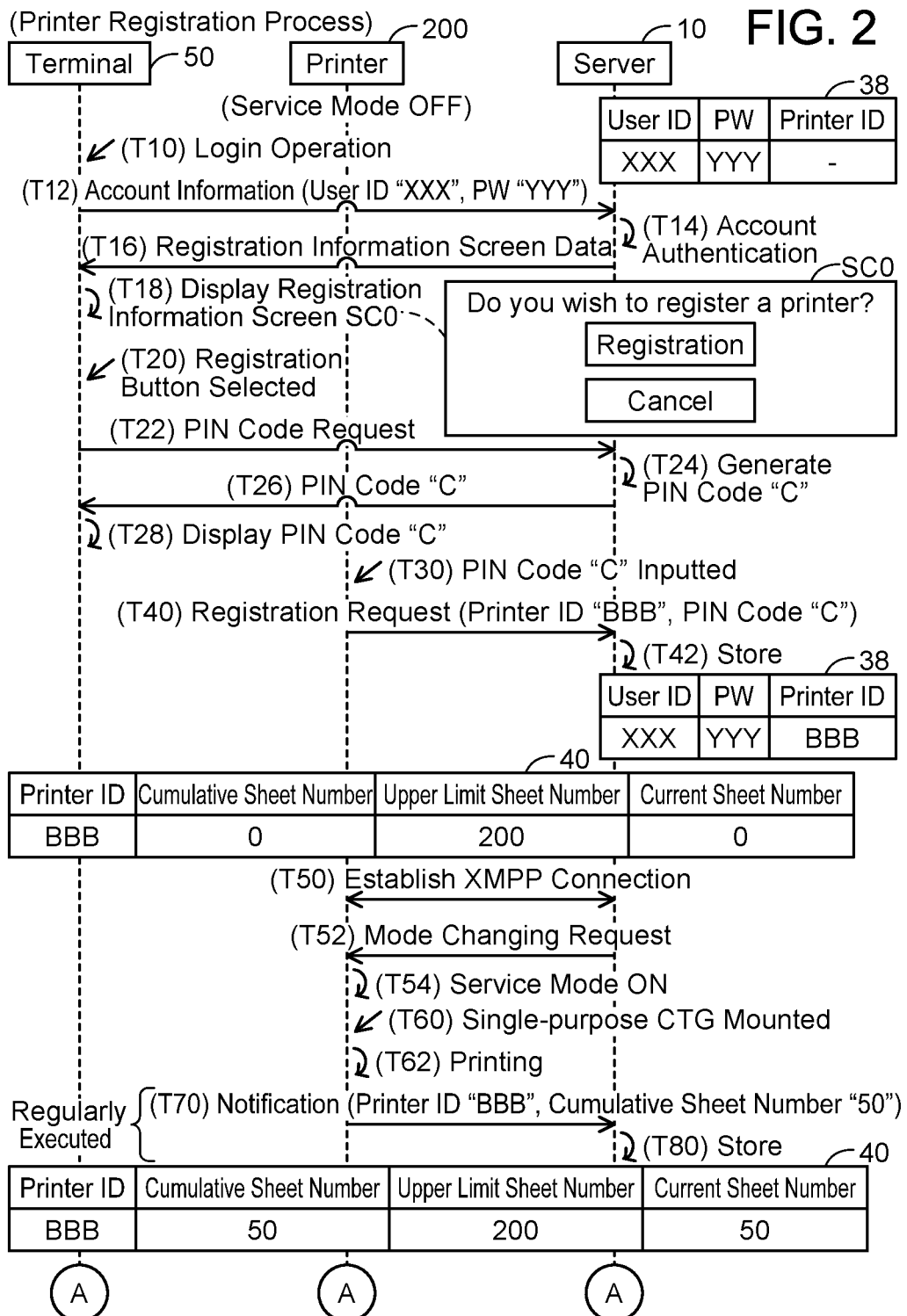
FIG. 2 shows a sequence diagram of a printer registration process.

Printer Registration Process; FIG. 2

Next, a registration process for registering information related to the printer 200 in the server 10 will be described with reference to FIG. 2. In an initial state of FIG. 2, the operation mode of the printer 200 is the service mode OFF. That is, the printer 200 is incapable of executing printing by using the single-purpose CTG. Further, in the initial state of FIG. 2, the server 10 has already stored a user ID "XXX" and a PW "YYY" in association with each other in the user table 38. The user accesses the server 10 by using, for example, the terminal 50 to register these pieces of information (i.e., account information) in advance in the server 10.

In the following description, for easier understanding, processes executed by a CPU (e.g., the CPU 32) of each device (e.g., the server 10) will be described with each device (e.g., the server 10) as the subject of action, without describing the CPU as the subject of action. Further, every communication executed by the server 10 and the printers 100, 200 to be described below is executed via the communication I/Fs 20, 120, and 220. Therefore, in the following description, phrase "via the communication I/F 20 (or 120, 220)" will be omitted for explanation of processes related to communication.

When accepting, from the user, a login operation including designation of a Uniform Resource Locator (URL) of the server 10 and input of account information (i.e., the user ID "XXX" and the PW "YYY") in T10, the terminal 50 sends the account information to the server 10 in T12.

When receiving the account information from the terminal 50 in T12, the server 10 executes account authentication in T14. Specifically, the server 10 determines whether the received account information is in the user table 38 or not. In the present embodiment, the server 10 determines that the received account information is in the user table 38 (i.e., determines that the account authentication is successful), and executes subsequence processes from T16. The server 10 sends registration information screen data to the terminal 50 in T16.

When receiving the registration information screen data from the server 10 in T16, the terminal 50 displays a registration information screen SC0 represented by the registration information screen data in T18. The registration information screen SC0 includes a message that asks whether to register a printer, a registration button, and a cancel button. When accepting selection of the registration button in the registration information screen SC0 in T20, the terminal 50 sends a PIN code request to the server 10 in T22.

When receiving the PIN code request from the terminal 50 in T22, the server 10 generates a PIN code "C" in T24 and stores the PIN code "C" to the memory 34 in association with the account information (i.e., the user ID "XXX" and the PW "YYY") that has been successfully authenticated in T14. In T26, the server 10 sends the PIN code "C" generated in T24 to the terminal 50.

When receiving the PIN code "C" from the server 10 in T26, the terminal 50 displays the PIN code "C" in T28. As a result, the user can know the PIN code "C".

When accepting input of the PIN code "C" from the user in T30, the printer 200 sends a registration request to the server 10 in T40. The registration request includes the printer ID "BBB" of the printer 200 and the PIN code "C" inputted in T30.

When receiving the registration request from the printer 200 in T40, the server 10 stores the printer ID "BBB" included in the registration request into the user table 38 and the sheet number table 40 in T42. Specifically, the server 10 firstly identifies, from the user table 38, the account information (i.e., the user ID "XXX" and the PW "YYY") stored in association with the PIN code "C" included in the registration request. Then, the server 10 stores the printer ID "BBB" to the user table 38 in association with the identified account information. Further, the server 10 stores the printer ID "BBB", a cumulative sheet number "0", a preset upper limit sheet number "200", and a current sheet number "0" in association with each other into the sheet number table 40.

After that, information (e.g., an access token) for establishing an Extensible Messaging and Presence Protocol (XMPP) connection, which is so-called full-time connection, between the server 10 and the printer 200 is communicated, as a result of which an XMPP connection is established between the server 10 and the printer 200 in T50. By using the XMPP connection, the server 10 can send signals to the printer 200 beyond the firewall of the LAN 4 to which the printer 200 belongs, without receiving requests from the printer 200.

The server 10 then sends a mode changing request to the printer 200 in T52 by using the XMPP connection. The mode changing request is a signal that requests the operation mode of the printer 200 to be changed from the service mode OFF to the service mode ON.

When receiving the mode changing request from the server 10 in T52, the printer 200 changes the service mode flag 238 from OFF to ON in T54. That is, the operation mode of the printer 200 is set to the service mode ON. As a result, the printer 200 can be used to provide the flat-rate printing service to the user. In this case, the printer 200 stores "0" as the cumulative sheet number.

When the registration request is sent to the server 10 in T40, the server 10 executes a process for shipping the single-purpose CTG to the user of the printer 200. Therefore, the user can receive the single-purpose CTG. In T60, the single-purpose CTG is mounted to the printer 200. At this time, the printer 200 can know that the single-purpose CTG has been mounted by reading information in the IC chip of the single-purpose CTG. The printer 200 updates the cumulative sheet number in the memory 234 each time it executes printing by using the single-purpose CTG mounted thereon. Since the operation mode of the printer 200 is the service mode ON (i.e., the service mode flag 238 is ON) when the single-purpose CTG is mounted to the printer 200, the printer 200 does not display a notification screen SC1 (see FIG. 3), which will be described later. It is possible to prevent the screen from being unnecessarily displayed.

The printer 200 executes printing by using the single-purpose CTG in T62 and updates the cumulative sheet number in the memory 234. In the present embodiment, the printing is executed to 50 sheets of print medium in T62, therefore, "50" is stored as the cumulative sheet number. When a predetermined timing (for example, a predetermined time of the day) arrives, the printer 200 sends a notification including the printer ID "BBB" and the cumulative sheet number "50" in the memory 234 to the server 10 in T70.

When receiving the notification from the printer 200 in T70, the server 10 updates the sheet number table 40 in T80. Specifically, the server 10 firstly identifies, from the sheet number table 40, the cumulative sheet number "0" and the current sheet number "0" associated with the printer ID "BBB" included in the notification of T70. Next, the server 10 calculates a difference "50" between the identified cumulative sheet number (in the present case, "0") and the cumulative sheet number "50" included in the notification of T70. Then, the server 10 updates the current sheet number by adding the difference "50" to the identified current sheet number (in the present case, "0"). The server 10 further updates the identified cumulative sheet number (in the present case, "0") to the cumulative sheet number "50" included in the notification of T70. The processes of T70 and T80 are executed regularly (e.g., every day).

Figure 3:
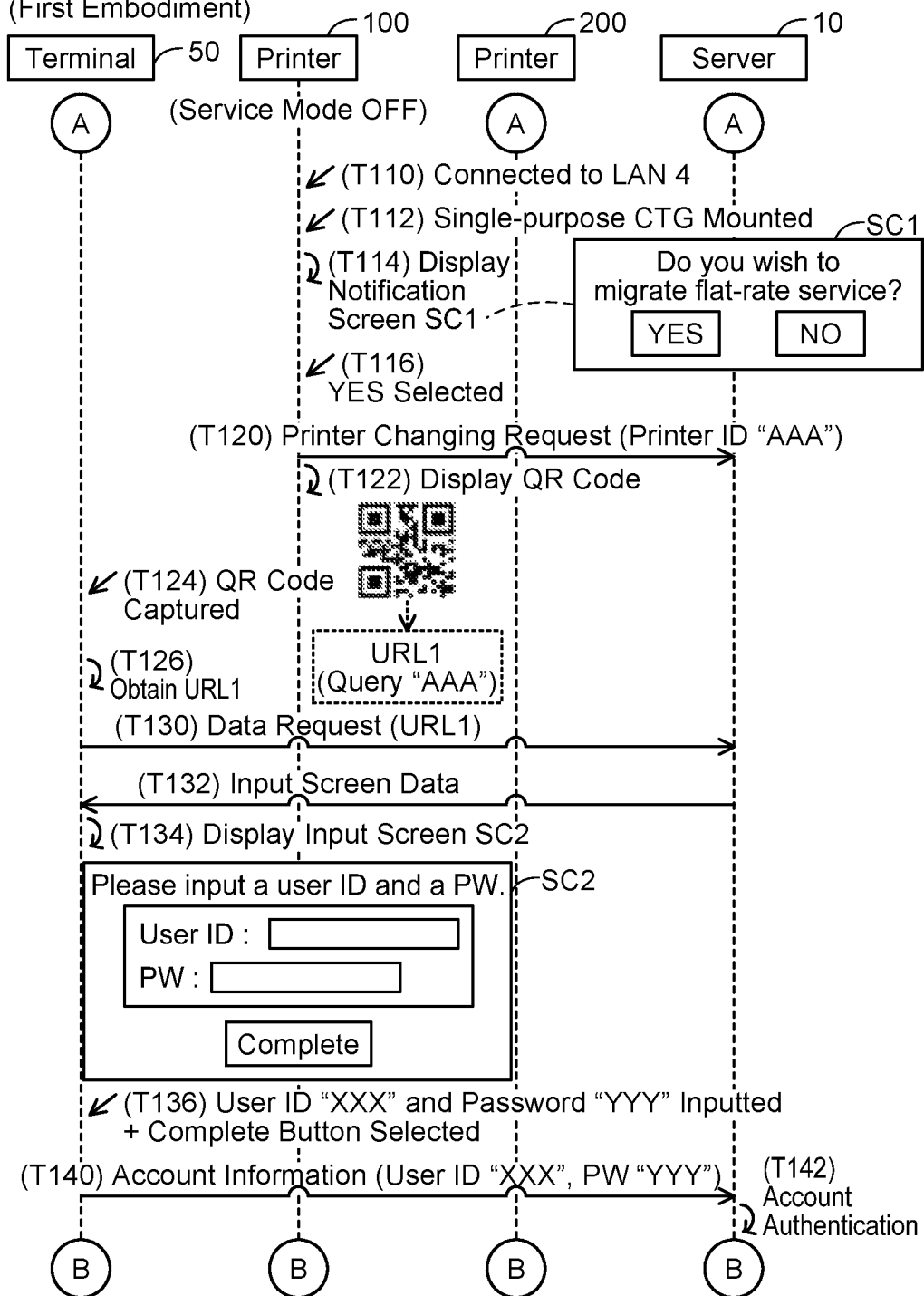
FIG. 3 shows a sequence diagram according to a first embodiment.
Figure 4:
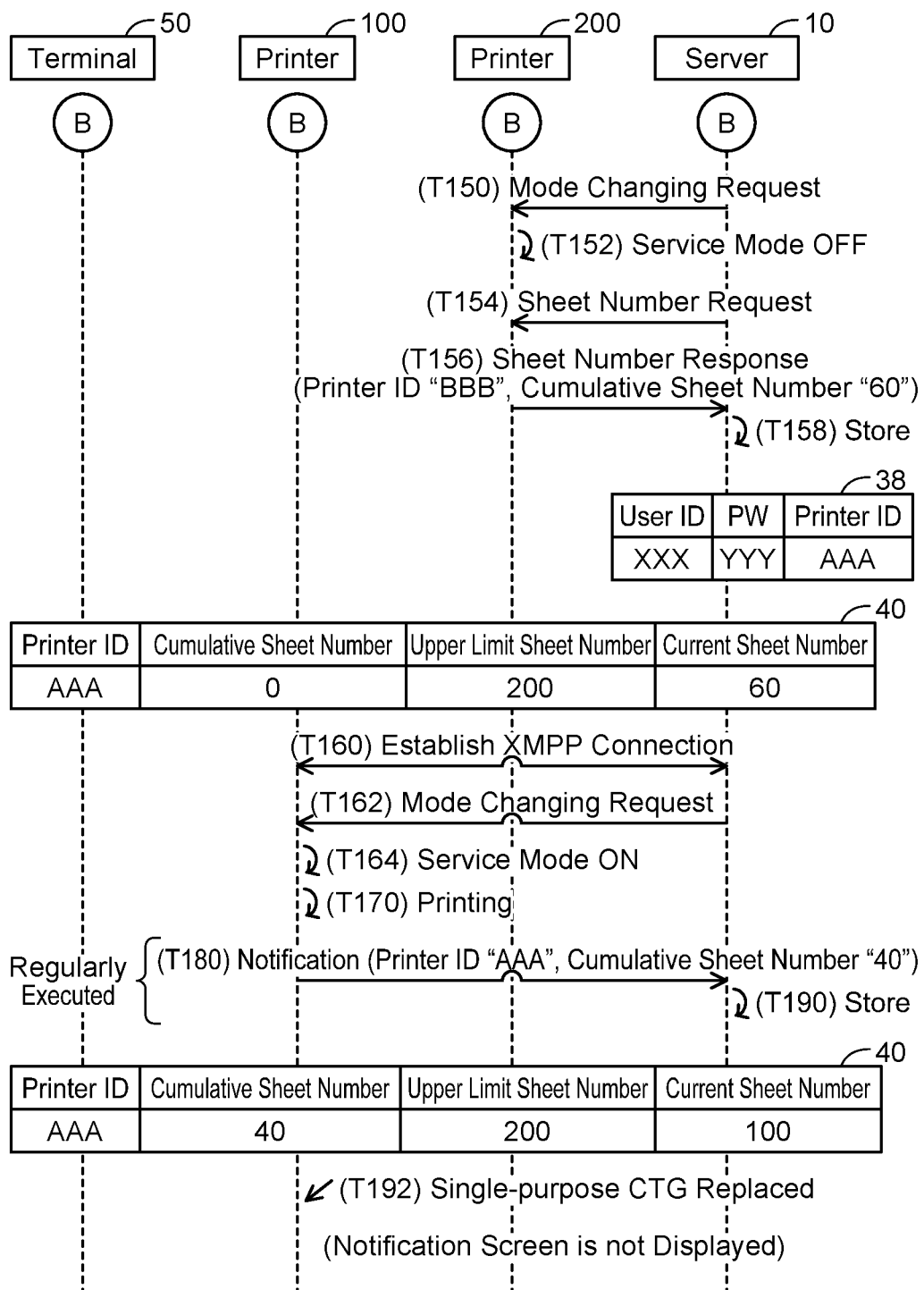
FIG. 4 shows a sequence diagram continued from FIG. 3.

Printer Change; FIGS. 3 and 4

Next, with reference to FIGS. 3 and 4, a process for changing the printer used for the flat-rate printing service from the printer 200 to the printer 100 will be described. In the following description, the printer used for the flat-rate printing service may be referred to as "service-target printer". FIG. 3 is a continuation of FIG. 2, where the operation mode of the printer 100 is the service mode OFF and the operation mode of the printer 200 is the service mode ON (see T54 of FIG. 2).

In T110, the printer 100 is additionally connected to the LAN 4. Next, in T112, a single-purpose CTG is mounted to the printer 100. This single-purpose CTG may be the single-purpose CTG that was mounted to the printer 200 in T60 of FIG. 2, or may be a single-purpose CTG that was newly sent to the user (i.e., a single-purpose CTG that was sent for the printer 200 but has not been mounted to the printer 200 yet). The printer 100 displays a notification screen SC1 in T114 when accepting an operation of mounting the single-purpose CTG and determining that the operation mode of the printer 100 is the service mode OFF. The notification screen SC1 includes a message that asks whether to change the printer used for the flat-rate printing service, a YES button, and a NO button. The user can cause the printer 100 to start a process for changing the printer used for the flat-rate printing service by operating the YES button in the notification screen SC1. This improves the user convenience.

Here, a comparative example is assumed in which the notification screen SC1 is displayed in response to the printer 100 being turned on, before the single-purpose CTG is mounted thereon. In this comparative example, the notification screen SC1 is displayed even when a user who does not wish to receive the flat-rate printing service turns on the printer 100. That is, even when the notification screen SC1 does not need to be displayed, the notification screen SC1 is displayed. To the contrary, in the present embodiment, the printer 100 displays the notification screen SC1 when accepting the operation of mounting the single-purpose CTG. As described, the single-purpose CTG is a CTG that is shipped when the flat-rate printing service has been concluded, thus a user who does not wish to receive the flat-rate printing service possesses no single-purpose CTGs. Therefore, the notification screen SC1 is not displayed when a user who does not wish to receive the flat-rate printing service uses the printer 100. As described, the present embodiment can prevent the notification screen SC1 from being displayed when the notification screen SC1 need not be displayed.

When accepting an operation of selecting the YES button in the notification screen SC1 in T116, the printer 100 sends a printer changing request including the printer ID "AAA" of the printer 100 to the server 10 in T120. The printer changing request is a signal that requests the server 10 to change the service-target printer. In T122, the printer 100 displays a QR Code. The QR Code is an image in which a URL1 is coded. The URL1 is stored in advance in the memory 134. The URL1 is information indicating a location in the server 10, especially, information indicating a location of input screen data representing an input screen SC2 for input of account information. The URL1 further includes the printer ID "AAA" of the printer 100 as a query.

In T124, the user captures the QR Code displayed in T122 by using the camera of the terminal 50. In this case, the terminal 50 obtains the URL1 by decoding the QR Code in T126. Then, the terminal 50 sends a data request including the URL1 to the server 10 in T130. The data request is a signal that requests the server 10 to send input screen data representing the input screen SC2.

When receiving the data request from the terminal 50 in T130, the server 10 sends the input screen data to the terminal 50 in T132. Here, the server 10 can obtain the printer ID "AAA" based on the query of the URL1 included in the data request. Then, the server 10 determines that the printer ID "AAA" included in the printer changing request received in T120 is identical to the printer ID "AAA" obtained from the URL1, and can know that the service-target printer should be changed to the printer 100 identified by the printer ID "AAA". In order to execute account authentication for the change, the server 10 sends the input screen data to the terminal 50 in T132.

When receiving the input screen data from the server 10 in T132, the terminal 50 displays the input screen SC2 represented by the input screen data in T134. The input screen SC2 includes a message prompting input of account information, an input field for a user ID, an input field for a PW, and a completion button.

As described, when the YES button in the notification screen SC1 is selected at the printer 100, the QR Code is displayed (T122), the QR Code is captured by the terminal 50 (T124), and the input screen SC2 is displayed at the terminal 50. Thus, the user does not have to manually input the URL1 into the terminal 50 to display the input screen SC2 at the terminal 50. This improves the user convenience.

When accepting, from the user, an operation including input of account information (i.e., the user ID "XXX" and the PW "YYY") and selection of the completion button in T136, the terminal 50 sends the account information to the server 10 in T140.

When receiving the account information from the terminal 50 in T140, the server 10 executes account authentication in T142. In the present embodiment, the server 10 determines that the received account information is in the user table 38 (that is, determines that the account authentication is successful), and executes a process of FIG. 4. In particular, as described, the server 10 recognizes that this account authentication is for changing the service-target printer to the printer 100 (see the above description related to T130 and T132). Therefore, when the account authentication is successful, the server 10 executes the process of FIG. 4 to change the service-target printer to the printer 100. Through the process, the server 10 can appropriately register the printer 100 as the service-target printer instead of the printer 200 identified by the printer ID "BBB" associated with the account information (i.e., the user ID "XXX" and the PW "YYY") for which the account authentication was successful.

Here, a comparative example is assumed in which the account authentication is not executed when the service-target printer is to be changed from the printer 200 to the printer 100. In this comparative example, if a third party obtains a single-purpose CTG and mounts it to a printer of the third party, the service-target printer may be changed from the printer 200 to the printer of the third party. That is, the service-target printer may be changed without the user of the printer 200 not knowing the change. The present embodiment can prevent a third party from changing the service-target printer because the account authentication is executed when the service-target printer is to be changed.

Continuation of Process of FIG. 3; FIG. 4

In T150 of FIG. 4, the server 10 sends a mode changing request to the printer 200 by using the XMPP connection. This mode changing request is a signal that requests the operation mode of the printer 200 to be changed from the service mode ON to the service mode OFF.

When receiving the mode changing request from the server 10 in T150, the printer 200 changes the service mode flag 238 from ON to OFF in T152. That is, the operation mode of the printer 200 is set to the service mode OFF. As a result, the printer 200 becomes incapable of executing printing by using the single-purpose CTG That is, the printer 200 is incapable of executing printing unless a general-purpose CTG is mounted thereon. As described, the operation mode of the printer 200 is automatically changed to the service mode OFF without the user operating the printer 200. This prevents operation modes of two or more printers including the printers 100 and 200 that can be used by the same user from being the service mode ON simultaneously.

In T154, the server 10 sends a sheet number request to the printer 200 using the XMPP connection. The sheet number request is a signal that requests the latest cumulative sheet number currently stored in the printer 200 to be sent.

When receiving the sheet number request from the server 10 in T154, the printer 200 sends a sheet number response including the printer ID "BBB" of the printer 200 and the cumulative sheet number ("60" in the present case) in the memory 234 to the server 10 in T156. Here, the reason why the cumulative sheet number of the printer 200 is not "50" but "60" is because printing has been executed to 10 sheets of print medium after the printing of T62 in FIG. 2 was executed at the printer 200. As described, the processes of T70 and T80 in FIG. 2 are executed, for example, everyday. The period by which the notification of T70 is executed is relatively long. Therefore, another printing may be executed at the printer 200 between the time when the printer 200 sent a notification including the cumulative sheet number to the server 10 and the time when the next notification is sent. In this case, the latest cumulative sheet number stored in the printer 200 may be different from the cumulative sheet number stored in the server 10. In the present embodiment, a notification including the cumulative sheet number "60" has not been sent to the server 10 yet after the cumulative sheet number of the printer 200 changed to "60". Therefore, at the time of T156, the cumulative sheet number "50" and the current sheet number "50" are stored in association with the printer ID "BBB" in the sheet number table 40 of the server 10 (see T80 in FIG. 2). The process of T156 is executed to store the latest cumulative sheet number of the printer 200 to the server 10. When the process of T156 is completed, the XMPP connections established in T50 of FIG. 2 may be disconnected.

When receiving the sheet number response in T156, the server 10 updates the user table 38 and the sheet number table 40 in T158. The server 10 firstly updates the user table 38. Specifically, the server 10 stores the printer ID "AAA" included in the printer changing request received in T120 of FIG. 3 (i.e., the printer ID "AAA" included in the URL1 in the data request received in T130), instead of the printer ID "BBB", in association with the account information for which the account authentication was successful in T142 of FIG. 3.

The server 10 further updates the sheet number table 40. Specifically, the server 10 identifies the cumulative sheet number "50" associated with the printer ID "BBB" and calculates a difference "10" between the identified cumulative sheet number "50" and the cumulative sheet number "60" included in the sheet number response of T156. Then, the server 10 updates the current sheet number by adding the difference "10" to the current sheet number "50" associated with the printer ID "BBB". In this way, the server 10 can properly store the latest current sheet number. The server 10 further updates the cumulative sheet number associated with the printer ID "BBB" to "0". The server 10 further stores the printer ID "AAA" instead of the printer ID "BBB".

Processes of T160 to T190 are the same as the processes of T50 to T80 in FIG. 2 except that the printer 100 is used instead of the printer 200 and that the current sheet number is updated from "60" (see T158) to "100" in response to the cumulative sheet number "40" being sent to the server 10.

After that, the printer 100 repeatedly executes printing by using the single-purpose CTG. As a result, the color material in the single-purpose CTG runs out. In T192, the single-purpose CTG of the printer 100 is replaced. That is, at the printer 100, the mounted single-purpose CTG is detached, and a new single-purpose CTG is mounted. At this time, the printer 100 does not display the notification screen SC1 (T114 in FIG. 3) because the operation mode of the printer 100 is the service mode ON (i.e., the service mode flag 138 is ON). This prevents the screen from being unnecessarily displayed.

Effects of First Embodiment

As described, the printer 100 displays the notification screen SC1 (T114) when accepting the operation of mounting the single-purpose CTG (T112 in FIG. 3) in a state where the printer ID "BBB" of the printer 200 and the current sheet number are stored in association with each other in the server 10. Then, when accepting the operation of selecting the YES button in the notification screen SC1 from the user (T116), the printer 100 sends the printer changing request including the printer ID "AAA" of the printer 100 to the server 10 (T120). As a result, in the server 10, the printer ID "AAA" is stored, instead of the printer ID "BBB", in association with the current sheet number (T158 in FIG. 4). Accordingly, the printer used for the flat-rate printing service (i.e., service-target printer) can be changed from the printer 200 to the printer 100.

Here, a comparative example is assumed in which the same operations as in FIG. 2 are performed by the user in order to newly register the printer 100 as the service-target printer. That is, in the comparative example, the user performs the login operation to the server 10 (T10 in FIG. 2), the operation of selecting the registration button in the registration information screen SC0 (T20), and the operation of inputting a PIN code to the printer 100 (the same operation as T30 to the printer 100). In this case, the server 10 may store the printer ID "AAA", instead of the printer ID "BBB", in association with the account information (i.e., the user ID "XXX", etc.) (see T42 in FIG. 2). If the same processes as T154 and T156 of FIG. 4 are further executed, the server 10 may update the sheet number table 40. However, the comparative example requires the operation of inputting a PIN code to the printer 100, and thus increases the user's workload. To the contrary, the present embodiment does not require the user to perform the operation of inputting a PIN code to the printer 100 (see FIGS. 3 and 4). Therefore, the user convenience can be improved as compared to the comparative example.

Correspondence Relationships

The printer 100, the printer 200, and the terminal 50 are examples of "first printer", "second printer", and "terminal device", respectively. The display unit 114 is an example of "display unit (and output unit)". The printer ID "AAA" and the printer ID "BBB" are examples of "first printer identification information" and "second printer identification information", respectively. The flat-rate printing service is an example of "service". The current sheet number is an example of "service-related information". The operation of mounting the single-purpose CTG (T112 in FIG. 3) and the operation of selecting the YES button in the notification screen SC1 (T116) are examples of "first predetermined operation" and "second predetermined operation", respectively. The user ID "XXX" and the PW "YYY" are an example of "first account information (and second account information)". The URL1 is an example of "location information". The service mode ON and the service mode OFF are examples of "first mode" and "second mode", respectively. The sheet number request sent in T154 of FIG. 4 and the sheet number response sent in T156 are examples of "information request" and "current information", respectively.

The process of T114, the process of T120, and the process of T122 in FIG. 3 are examples of "cause the display unit to display a notification screen", "send a printer changing request", and "cause an output unit to output location information" executed by the "first printer", respectively.

The process of T120 in FIG. 3 and the process of T158 in FIG. 4 are examples of "receive a printer changing request" and "store the first printer identification information" executed by the "server", respectively. The process of T140 is an example of "receive first account information". The process of T154, the process of T156, and the process of T158 are examples of "send an information request", "receive current information", and "update the specific service-related information", respectively. The process of T150 is an example of "send a mode changing request".

Figure 5:
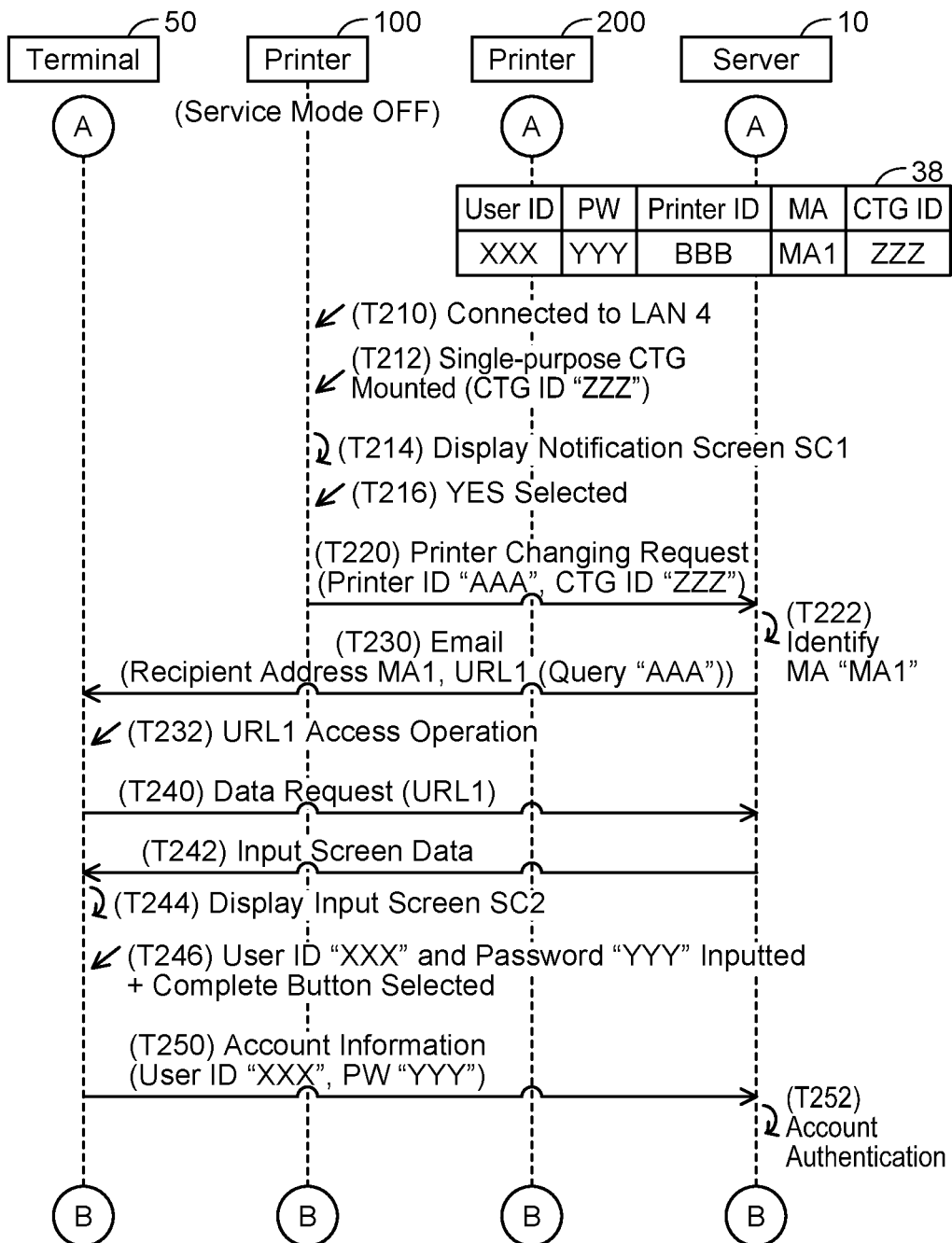
FIG. 5 shows a sequence diagram according to a second embodiment.

Second Embodiment; FIG. 5

Next, a second embodiment will be described with reference to FIG. 5. In the second embodiment, the terminal 50 obtains the URL1 in a different manner from the first embodiment. The memory 34 of the server 10 stores, in the user table 38, a user ID, a PW, a printer ID, an email address (hereinafter, simply referred to as "MA"), and a CTG ID in association with each other. The MA indicates a recipient to which an email is sent. The email includes the URL1 in its body text. The user accesses the server 10 by using, for example, the terminal 50 and registers the account information and the MA in association with each other in advance in the server 10. The CTG ID is information for identifying a single-purpose CTG. The CTG ID is stored in the IC chip of the single-purpose CTG Each time the server 10 executes the process for shipping a single-purpose CTG to the user, the server 10 stores the CTG ID of the single-purpose CTG in association with the account information of the user in the user table 38. In an initial state of FIG. 5, the server 10 has already stored the user ID "XXX", the PW "YYY", the printer ID "BBB", an MA "MA1", and a CTG ID "ZZZ" in association with each other in the user table 38.

The process of FIG. 5 is a continuation of the process of FIG. 2. A process of T210 in FIG. 5 is the same as the process of T110 in FIG. 3. In T212, a single-purpose CTG is mounted to the printer 100. Since the CTG ID "ZZZ" is stored in the IC chip of this single-purpose CTG, the printer 100 can read the CTG ID "ZZZ" from the IC chip of the single-purpose CTG. Processes of T214 and T216 are the same as the processes of T114 and T116 in FIG. 3. A process of T220 is the same as the process of T120 in FIG. 3 except that the CTG ID "ZZZ" of the single-purpose CTG is included in the printer changing request.

When receiving the printer changing request including the printer ID "AAA" and the CTG ID "ZZZ" in T220, the server 10 identifies the MA "MA1" associated with the CTG ID "ZZZ" included in the printer changing request in T222. Then, in T230, the server 10 sends the terminal 50 an email including the URL1 and the MA "MA1" as a recipient address.

When receiving the email from the server 10 in T230, the terminal 50 can display the email. Then, in T232, the user uses the terminal 50 to perform an operation for accessing the URL1 included in the email (e.g., an operation of clicking the URL1). Processes of T240 to T252 executed in response to that operation are the same as the processes of T130 to T142 in FIG. 3. As above, the user does not have to manually input the URL1 into the terminal 50 to display the input screen SC2 at the terminal 50. This improves the user convenience. The subsequent processes are the same as those of FIG. 4.

Correspondence Relationships

The CTG ID and the CTG ID "ZZZ" are examples of "cartridge identification information" and "specific cartridge identification information", respectively. The MA "MA1" is an example of "specific email address". The process of T230, the process of T240, and the process of T242 in FIG.

5 are examples of "send an email", "receive a data request", and "send the input screen data" executed by the "server", respectively.

Figure 6:
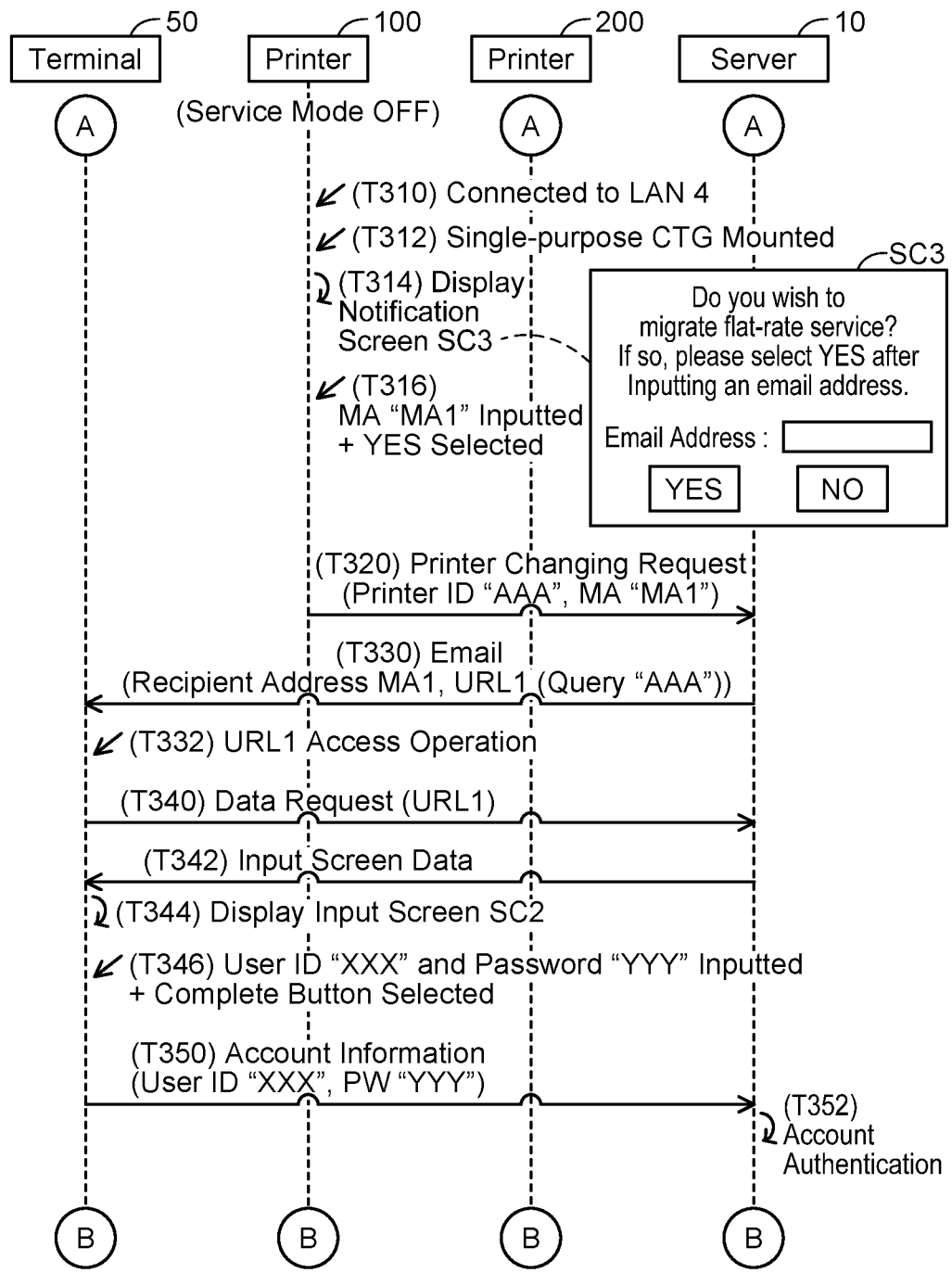
FIG. 6 shows a sequence diagram according to a third embodiment.

Third Embodiment; FIG. 6

Next, a third embodiment will be described with reference to FIG. 6. In the third embodiment, the server 10 identifies the email address "MA1" in a different manner from the second embodiment. In the present embodiment, the server 10 stores no MAs and no CTG IDs in the user table 38.

The process of FIG. 6 is a continuation of the process of FIG. 2. Processes of T310 and T312 in FIG. 6 are the same as the processes of T110 and T112 in FIG. 3. The printer 100 displays a notification screen SC3 in T314. The notification screen SC3 includes a message that asks whether to change the printer used for the flat-rate printing service, a message that prompts input of an MA, an input field for MA, a YES button, and a NO button. When accepting an operation of inputting the MA "MA1" into the input field for MA and an operation of selecting the YES button in T316, the printer 100 sends a printer changing request including the printer ID "AAA" of the printer 100 and the MA "MA1" inputted in T316 to the server 10 in T320.

By receiving the printer changing request from the printer 100 in T320, the server 10 can identify the email address "MA1" included in the printer changing request. Processes of T330 to T352 are the same as the processes of T230 to T252 in FIG. 5. As above, the user does not have to manually input the URL1 into the terminal 50 to display the input screen SC2 at the terminal 50. This improves the user convenience.

Correspondence Relationships

The notification screen SC3 is an example of "notification screen". The operation of inputting the MA "MA1" into the input field for MA and the operation of selecting the YES button in the notification screen SC3 are an example of "second predetermined operation".

Figure 7:
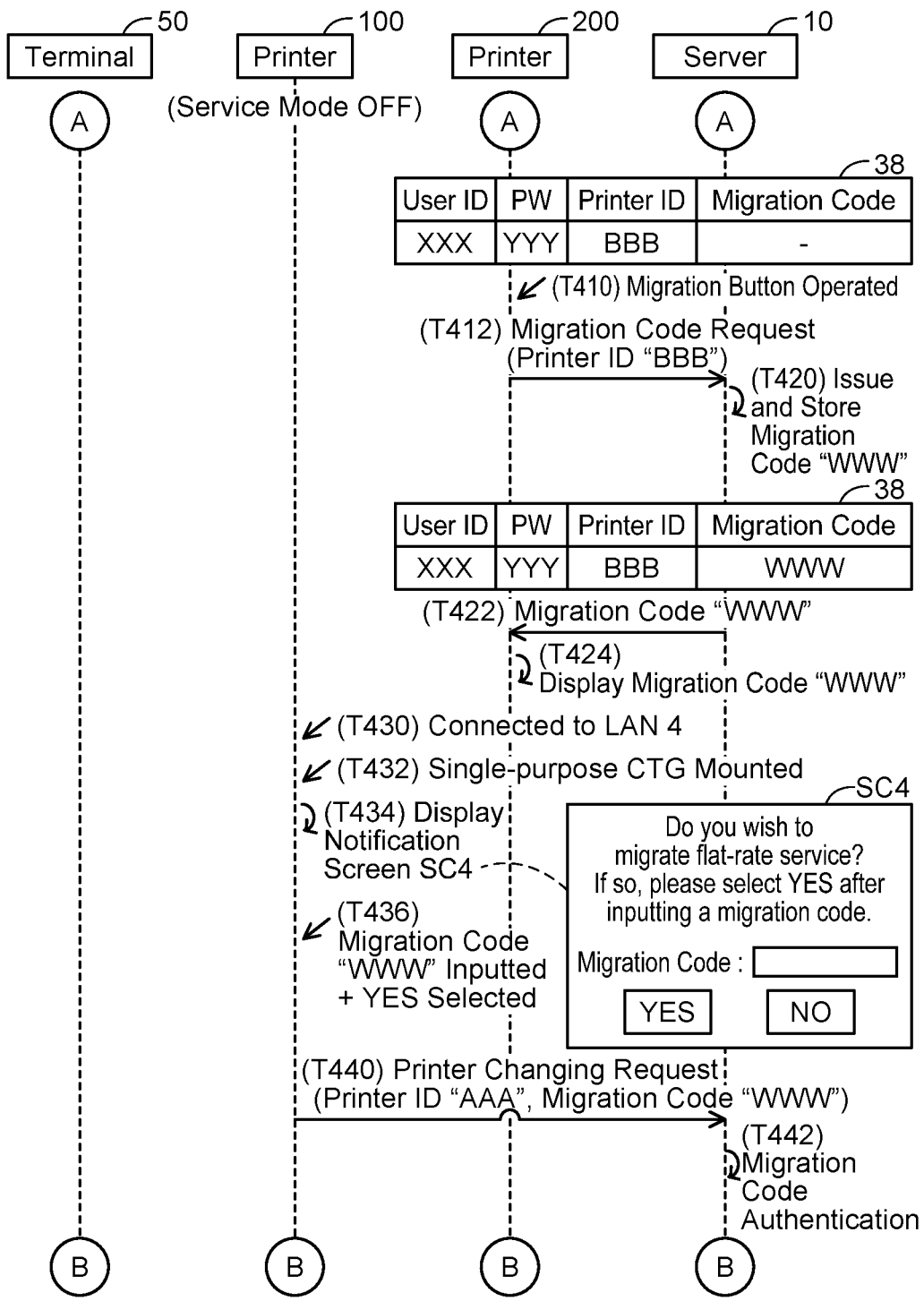
FIG. 7 shows a sequence diagram according to a fourth embodiment.

Fourth Embodiment; FIG. 7

Next, a fourth embodiment will be described with reference to FIG. 7. The fourth embodiment is different from the first embodiment in that the service-target printer is changed from the printer 200 to the printer 100 without input of account information to the terminal 50. The memory 34 of the server 10 stores a user ID, a PW, a printer ID, and a migration code in association with each other in the user table 38. The migration code is information used for authentication to change the service-target printer.

The process of FIG. 7 is a continuation of the process of FIG. 2. In an initial state of FIG. 7, no migration code is stored in association with account information (i.e., the user ID "XXX", etc.).

When accepting an operation of selecting a migration button from the user in T410 of FIG. 7, the printer 200 sends a migration code request requesting issuance of a migration code to the server 10 in T412. The migration code request includes the printer ID "BBB" of the printer 200.

When receiving the migration code request from the printer 200 in T412, the server 10 issues (i.e., generates) a migration code "WWW" and stores the migration code "WWW" to the user table 38 in association with the printer ID "BBB" included in the migration code request in T420.

Then, in T422, the server 10 sends the migration code "WWW" issued in T420 to the printer 200.

When receiving the migration code "WWW" from the server 10 in T422, the printer 200 displays the migration code "WWW" in T424. As a result, the user can know the migration code "WWW". In a variant, the printer 200 may print the migration code "WWW".

Processes of T430 and T432 are the same as the processes of T110 and T112 in FIG. 3. The printer 100 displays a notification screen SC4 in T434. The notification screen SC4 includes a message that asks whether to change the printer used for the flat-rate printing service, a message that prompts input of a migration code, an input field for migration code, a YES button, and a NO button. When accepting an operation of inputting the migration code "WWW" into the input field for migration code and an operation of selecting the YES button in T436, the printer 100 sends a printer changing request including the printer ID "AAA" of the printer 100 and the migration code "WWW" inputted in T436 to the server 10 in T440.

When receiving the printer changing request including the printer ID "AAA" and the migration code "WWW" from the printer 100 in T440, the server 10 executes authentication for the migration code in T442. Specifically, the server 10 determines whether or not the migration code "WWW" included in the printer changing request is in the user table 38. In the present embodiment, the server 10 determines that the migration code "WWW" is in the user table 38 (i.e., determines that the authentication is successful), and executes the process of FIG. 4. As above, the user does not have to input account information into the terminal 50 to change the service-target printer. This improves the user convenience. Further, the server 10 stores the migration code "WWW" and the printer ID "BBB" in association with each other in the user table 38. Therefore, the server 10 can appropriately register the printer 100 as the service-target printer instead of the printer 200 identified by the printer ID "BBB" associated with the migration code "WWW" included in the printer changing request received in T440.

Correspondence Relationships

The migration code and the migration code "WWW" are examples of "authentication information" and "specific authentication information", respectively. The migration code request sent in T412 of FIG. 7 is an example of "authentication information request". The notification screen SC4 is an example of the "notification screen". The operation of inputting the migration code "WWW" to the input field for migration code and the operation of selecting the YES button in the notification screen SC4 are an example of the "second predetermined operation". The process of T412, the process of T420, and the process of T422 are examples of "receive an authentication information request", "store specific authentication information", and "send the specific authentication information" executed by the "server", respectively.

(Variant 1) The "service" is not limited to the flat-rate printing service described in the above embodiments, and may be, for example, a measured-rate printing service. The measured-rate printing service is a service in which the number of printed sheets within a predetermined period is counted every predetermined period (e.g., every month) and a fee is charged according to the number of printed sheets.

(Variant 2) The flat-rate printing service is not limited to the aspects described in the above-described embodiments. For example, the flat-rate printing service may be a service that allows printing by using a preset number of CTGs at a fixed rate every predetermined period. In this variant, the number of times CTGs are replaced within the predetermined period is an example of the "service-related information". In another variant, the flat-rate printing service may be a service that allows printing by using a preset amount of color material at a fixed rate every predetermined period. In this variant, an amount of used color material within the predetermined period is an example of the "service-related information".

(Variant 3) In the above-described embodiments, the "server" is configured as the single server 10. However, in a variant, the "server" may be configured of a plurality of servers including a first server and a second server. In this variant, for example, the first server may execute the process of T14 in FIG. 2 and the processes of T132 and T142 in FIG. 3. Further, the second server may execute the processes of T24, T42, T50, T52, and T80 in FIG. 2 and the processes of T150, T154, T158, T160, T162, and T190 in FIG. 4.

(Variant 4) The tables 38 and 40 of the server 10 may be stored in a database separate from the server 10. In this variant, the database is an example of "memory" of the "server".

(Variant 5) The process of the printer 100 outputting the URL1 is not limited to the display of the QR Code in T122 of FIG. 3, and may be, for example, a process of displaying a bar code indicating the URL1. In another variant, the printer 100 may provide the URL1 to a Near Field Communication (NFC) I/F. In this case, the NFC I/F stores the URL1. Therefore, the printer 100 can send the URL1 to the terminal 50 in response to the terminal 50 being moved closer to the printer 100. In this variant, providing the URL1 to the NFC I/F is an example of "cause an output unit to output location information" executed by "first printer". In another variant, the printer 100 may send the URL1 to the terminal 50 via a Bluetooth (BT) (registered trademark) I/F. In this variant, sending the URL1 via the BT I/F is an example of "cause an output unit to output location information" executed by the "first printer".

(Variant 6) In the above-described embodiments, the printer 100 displays the notification screen (SC1, SC3, or SC4) when accepting the operation of mounting the single-purpose CTG (T112 in FIG. 3, T212 in FIG. 5, T312 in FIG. 6, or T432 in FIG. 7). In a variant, the printer 100 may display the notification screen when accepting an operation of turning on the printer 100. In this variant, the operation of turning on the printer 100 is an example of the "first predetermined operation". In another variant, the printer 100 may display the notification screen when accepting an operation on a setting button for setting the printer 100 as the service-target printer. In this variant, the operation on the setting button of the printer 100 is an example of the "first predetermined operation".

(Variant 7) Each of the printers 100 and 200 may not be configured to use the two types of CTGs, namely the single-purpose CTG and the general-purpose CTG and may be configured to use only one type of CTG (e.g., the general-purpose CTG; hereinafter referred to as "normal CTG"). In this case, in T60 of FIG. 2, a normal CTG may be mounted instead of the single-purpose CTG. Further, if a normal CTG is mounted in T112 of FIG. 3, a notification screen may be displayed in T114. Generally speaking, the "first printer" is not limited to using both the single-purpose color material cartridge and the general-purpose color material cartridge. Further, the "first printer" is not limited to selectively operating in a plurality of modes including the first mode and the second mode.

(Variant 8) After sending the mode changing request to the printer 200 in T150 of FIG. 4, the server 10 may skip the processes of T154 and T156 and execute the process of T158. Specifically, in this variant, the server 10 may store the printer ID "AAA" in the user table 38 in association with the user ID "XXX" and the PW "YYY", update the cumulative sheet number to "0" in the sheet number table 40 without updating the current sheet number, and store the printer ID "AAA" instead of the printer ID "BBB". Generally speaking, "send an information request," "receive current information," and "update the specific service-related information" executed by the "server" may be omitted.

(Variant 9) The server 10 may not send a mode changing request to the printer 200 even though a printer changing request is received from the printer 100. That is, in this variant, the process of T150 in FIG. 4 may be omitted. Generally speaking, "send a mode changing request" executed by the "server" may be omitted.

(Variant 10) When the operation mode of the printer 100 (or 200) is the service mode ON, the printer 100 (or 200) may be capable of executing printing by using the single-purpose CTG and may be capable of executing printing by using the general-purpose CTG. In this case, the printer 100 (or 200) may store the cumulative sheet number of print medium printed by using the single-purpose CTG but may not store the cumulative sheet number of print medium printed by using the general-purpose CTG.

(Variant 11) In the above-described embodiments, each of the processes of FIGS. 2 to 7 is implemented by software (e.g., the program 36, 136, 236), but at least one of these processes may be implemented by hardware such as a logic circuit.

What is claimed is:
1. A communication system comprising a first printer and a server,
　the first printer comprising:
　　a display unit;
　　a first communication interface for communicating with the server; and
　　a first controller, and
　the server comprising:
　　a second communication interface for communicating with the printer;
　　a memory configured to store, for each of one or more printers, printer identification information for identifying the printer and service-related information for providing a service using the printer in association with each other, the service-related information being obtained by using information received from the printer; and
　　a second controller,
　wherein the first controller of the printer is configured to:
　　in a case where a first predetermined operation is accepted in a state where second printer identification information for identifying a second printer and specific service-related information are stored in association with each other in the server, cause the display unit to display a notification screen that prompts a second predetermined operation, the second printer being different from the first printer, and the second predetermined operation being for changing a printer used for the service from the second printer to the first printer; and
　　in a case where the second predetermined operation is accepted after the notification screen has been displayed, send a printer changing request including first printer identification information for identifying the first printer to the server via the first communication interface, wherein the second controller of the server is configured to:

in a state where the second printer identification information and the specific service-related information are stored in association with each other in the memory, receive the printer changing request from the first printer via the second communication interface; and in a case where the printer changing request is received from the first printer, store the first printer identification information included in the printer changing request, instead of the second printer identification information, in association with the specific service-related information.

2. The communication system as in claim 1, wherein the memory is configured to store, for each of the one or more printers, the printer identification information for identifying the printer, the service-related information for providing the service using the printer, and account information of a user of the printer in association with each other, the second controller is further configured to:

receive first account information inputted to a terminal device by a user of the first printer from the terminal device via the second communication interface, wherein in a case where the printer changing request is received from the first printer and the first account information received from the terminal device is identical to second account information stored in the memory in a state where the second printer identification information, the specific service-related information, and the second account information are stored in association with each other in the memory, the second controller is configured to store the first printer identification information included in the printer changing request, instead of the second printer identification information associated with the second account information, in association with the specific service-related information.

3. The communication system as in claim 2, wherein the first controller is further configured to:

in the case where the second predetermined operation is accepted after the notification screen have been displayed, cause an output unit to output location information indicating a location in the server, the location information indicating a location of input screen data representing an input screen for input of the first account information, wherein in response to the location information being outputted, the location information is obtained by the terminal device, the second controller is further configured to:

after the location information has obtained by the terminal device, send the input screen data to the terminal device, wherein after the input screen data has sent to the terminal device, the input screen is displayed at the terminal device.

4. The communication system as in claim 3, wherein the output unit is the display unit, and the display unit is caused to display a code image in which the location information is coded.

5. The communication system as in claim 2, wherein the second controller is further configured to:

in a case where the printer changing request is received from the first printer, send an email via the second communication interface, the email including a specific email address as a recipient address and location information indicating a location in the server, and the location information indicating a location of input screen data representing an input screen for input of the first account information;

after the email has been sent, receive a data request including the location information, via the second communication interface, from the terminal device that received the email; and in a case where the data request is received from the terminal device, send the input screen data to the terminal device via the communication interface, wherein after the input screen data has been sent to the terminal device, the second controller is configured to receive the first account information inputted to the input screen represented by the input screen data from the terminal device.

6. The communication system as in claim 5, wherein the memory is configured to store, for each of the one or more printers, the printer identification information for identifying the printer, the service-related information for providing the service using the printer, the account information of the user of the printer, an email address of the user, and cartridge identification information for identifying a color material cartridge which has been shipped to the user in association with each other, the printer changing request includes the first printer identification information and specific cartridge identification information for identifying a specific color material cartridge that has been mounted in the first printer, the email includes the specific email address associated with the specific cartridge identification information included in the printer changing request as the recipient address.

7. The communication system as in claim 5, wherein the second predetermined operation includes an operation of inputting a specific email address to the first printer, the printer changing request includes the first printer identification information and the inputted specific email address.

8. The communication system as in claim 1, wherein the second controller is further configured to:

receive an authentication information request including the second printer identification information from the second printer via the second communication interface;

in a case where the authentication information request is received from the second printer, store specific authentication information in the memory in association with the second printer identification information and the specific service-related information; and in the case where the authentication information request is received from the second printer, send the specific authentication information to the second printer via the second communication interface, wherein the specific authentication information is outputted by the second printer in response to the specific authentication information being sent to the second printer, the second predetermined operation includes an operation of inputting the specific authentication information to the first printer, the printer changing request includes the first printer identification information and the inputted specific authentication information, and the second controller is configured to store the first printer identification information included in the printer changing request, instead of the second printer identification information associated with the specific authentication information included in the printer changing request, in association with the specific service-related information.

9. The communication system as in claim 1, wherein
the first printer is configured to use both a single-purpose color material cartridge for receiving provision of the service and a general-purpose color material cartridge different from the single-purpose color material cartridge, and
the first predetermined operation includes an operation of mounting the single-purpose color material cartridge to the first printer.

10. The communication system as in claim 9, wherein
the first printer is configured to operate selectively in any one of a plurality of modes including a first mode in which the first printer is capable of executing printing by using the single-purpose color material cartridge and a second mode in which the first printer is capable of executing printing by using the general-purpose color material cartridge and is incapable of executing printing by using the single-purpose color material cartridge,
in a case where the first printer operates in the second mode and the first predetermined operation including the operation of mounting the single-purpose color material cartridge to the first printer is accepted, the first controller is configured to cause the display unit to display the notification screen, and
in a case where the first printer operates in the first mode and the first predetermined operation including the operation of mounting the single-purpose color material cartridge to the first printer is accepted, the notification screen is not displayed.

11. The communication system as in claim 1, wherein
the second controller is further configured to:
in the case where the printer changing request is received from the first printer, send an information request to the second printer via the second communication interface;
in a case where the information request is sent to the second printer, receive current information from the second printer via the second communication interface, the current information being information currently stored in the second printer; and
in a case where the current information is received from the second printer, update the specific service-related information by using the current information.

12. The communication system as in claim 1, wherein
each of the first printer and the second printer is configured to use both a single-purpose color material cartridge for receiving provision of the service and a general-purpose color material cartridge different from the single-purpose color material cartridge,
each of the first printer and the second printer is configured to operate selectively in any one of a plurality of modes including a first mode in which the printer is capable of executing printing by using the single-purpose color material cartridge and a second mode in which the printer is capable of executing printing by using the general-purpose color material cartridge and is incapable of executing printing by using the single-purpose color material cartridge, and
the second controller is further configured to:
in the case where the printer changing request is received from the first printer, send a mode changing request to the second printer via the second communication interface, the mode changing request being for changing an operation mode of the second printer from the first mode to the second mode.

\* \* \* \* \*